United States Patent
Kalamkar et al.

(10) Patent No.: US 11,474,891 B2
(45) Date of Patent: Oct. 18, 2022

(54) ENRICHED HIGH FIDELITY METRICS

(71) Applicant: Intuit Inc., Mountain View, CA (US)

(72) Inventors: Amit Shriram Kalamkar, Fremont, CA (US); Edward K. Lee, Mountain View, CA (US); Vigith Maurice, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/508,809

(22) Filed: Oct. 22, 2021

(65) Prior Publication Data
US 2022/0107863 A1    Apr. 7, 2022

Related U.S. Application Data

(62) Division of application No. 16/860,224, filed on Apr. 28, 2020, now Pat. No. 11,182,239.

(51) Int. Cl.
*G06F 11/07* (2006.01)

(52) U.S. Cl.
CPC ...... *G06F 11/0781* (2013.01); *G06F 11/0709* (2013.01); *G06F 11/0751* (2013.01); *G06F 11/0757* (2013.01); *G06F 11/0775* (2013.01); *G06F 11/0793* (2013.01)

(58) Field of Classification Search
CPC ............. G06F 11/0709; G06F 11/0751; G06F 11/0757; G06F 11/0775; G06F 11/0781; G06F 11/079; G06F 11/0793
See application file for complete search history.

(56) References Cited

U.S. PATENT DOCUMENTS

| | | | |
|---|---|---|---|
| 8,140,898 B2 | 3/2012 | Beg et al. | |
| 8,392,760 B2 | 3/2013 | Kandula et al. | |
| 9,367,421 B2 * | 6/2016 | Gilbao | H04L 43/065 |
| 9,497,072 B2 | 11/2016 | Gates et al. | |
| 10,162,696 B2 | 12/2018 | Kogan-Katz et al. | |

* cited by examiner

*Primary Examiner* — Joseph R Kudirka
(74) *Attorney, Agent, or Firm* — Ferguson Braswell Fraser Kubasta PC

(57) ABSTRACT

A method includes receiving first metrics describing first behaviors of applications having a fault, and second metrics describing second behaviors of an enterprise system in which the applications are executing. The first and second metrics are ingested. Ingesting includes assigning a first cardinality score to first metrics related to the fault. Ingesting also includes assigning a second, lower cardinality score to second metrics that are unrelated to the fault. Tumbling window processing is performed on the ingested metrics by sorting the first metrics and the second metrics into time slices. Each of the time slices includes a corresponding data structure for storing the data in the different time periods. Tumbling window processing is also performed on the ingested metrics by storing more data in the time slices for the first metrics having the first cardinality score relative to the second metrics having the second cardinality score.

20 Claims, 14 Drawing Sheets

Metrics 200

202 ↘        204 ↙

| Kind | Definition |
|---|---|
| SvcAlias | Service Asset Alias |
| ClientAlias | Client Asset Alias |
| AvgExecTime | Average Execution Time |
| AvgReqSize | Average Request Time |
| AvgRespSize | Average Response Time |
| AvgSvcTime | Average Service Time |
| Count | Total Count |
| Count2X  /— 206 | Count of Https status code 2X  /— 208 |
| Count3X | Count of Https status code 3X |
| Count4X | Count of Https status code 4X |
| Count5X | Count of Https status code 5X |
| Count500 | Count of Https status code 500 |
| Count501 | Count of Https status code 501 |
| Count502 | Count of Https status code 502 |
| Count503 | Count of Https status code 503 |
| Count504 | Count of Https status code 504 |

*FIG. 2*

Events 300

| Kind | Warning | Normal |
|---|---|---|
| Pod | Unhealthy — 310 | Scheduled — 312 |
| | FailedAttachVolume | BackOff |
| | FailedCreatePodSandBox | Pulled |
| | Evicted | NodeControllerEviction |
| | FailedSync | ScaleDown |
| | FailedScheduling | SandboxChanged |
| | FailedMount | Started |
| | ExceededGracePeriod | SuccessfulAttachVolume |
| | InspectFailed | TriggeredScaleUp |
| | BackOff | Created |
| | NetworkNotReady | NotTriggerScaleUp |
| | Failed | Pulling |
| | FailedKillPod | Killing |
| Service | EnsuredLoadBalancer | CreatingLoadBalancerFailed |
| | EnsuringLoadBalancer | |
| Rollup | ?? | TimeToLiveExpired |
| ReplicaSet | FailedCreate | SuccessfulCreate |
| | | SuccessfulDelete |
| PersistentVolumeClaim | ?? | ProvisioningSucceeded |

302, 304, 306, 308 annotations

*FIG. 3*

| Name | Component | Reason | Message |
|---|---|---|---|
| dg-orchestrator-appd-deployment-64d589b46b-swkc8 | kubulet | Unhealthy | Readiness probe failed: Get https://100.122.30.210:8443/health/full: net/http: request canceled while waiting for connection (Client.Timeout exceeded while awaiting headers) |
| dg-orchestrator-appd-deployment-64d589b46b-r4bq7 | kubulet | Unhealthy | Readiness probe failed: Get https://100.122.30.210:8443/health/full: net/http: request canceled while waiting for connection (Client.Timeout exceeded while awaiting headers) |
| dg-orchestrator-appd-deployment-64d589b46b-swkc8 | kubulet | Unhealthy | Readiness probe failed: Get https://100.122.30.210:8443/health/full: net/http: request canceled while waiting for connection (Client.Timeout exceeded while awaiting headers) |
| dg-orchestrator-appd-deployment-64d589b46b-swkc8 | kubulet | Unhealthy | Readiness probe failed: Get https://100.122.30.210:8443/health/full: net/http: request canceled while waiting for connection (Client.Timeout exceeded while awaiting headers) |
| dg-orchestrator-appd-deployment-64d589b46b-r4bq7 | kubulet | Unhealthy | Readiness probe failed: Get https://100.122.30.210:8443/health/full: net/http: request canceled while waiting for connection (Client.Timeout exceeded while awaiting headers) |
| dg-orchestrator-appd-deployment-64d589b46b- | kubulet | Unhealthy | Readiness probe failed: Get https://100.122.30.210:8443/health/full: net/http: request canceled while waiting for connection (Client.Timeout exceeded while awaiting headers) |

Warning 17

FIG. 10

ENRICHED HIGH FIDELITY METRICS

RELATED APPLICATIONS

This application is a divisional application of U.S. patent application Ser. No. 16/860,224, filed Apr. 28, 2020, now U.S. Pat. No. 11,182,239, the entirety of which is hereby incorporated by reference.

BACKGROUND

An enterprise system, as used herein, is a set of hardware and/or software used to accomplish a technical result for an organization. For example, an enterprise system may be hardware and/or software designed to execute and provide user access to software programs as a service (SaaS) over the Internet. The enterprise and the SaaS both may be maintained by a company that sells the SaaS. An enterprise may be large, e.g., providing the SaaS to tens of thousands of users concurrently.

Technical issues may arise in either the software being sold as a service, or in the enterprise itself. The technical issues may interfere with desired use of the software, from the user's perspective. The interference may be considered undesirable by the company selling the SaaS.

SUMMARY

The one or more embodiments provide for a method. The method includes receiving first metrics describing first behaviors of applications. The method also includes receiving second metrics describing second behaviors of an enterprise system in which the applications are executing, wherein at least one of the first metrics and the second metrics indicates a fault in at least one of the applications. The method also includes ingesting the first metrics and the second metrics to generate ingested metrics. Ingesting includes assigning a first cardinality score to first metrics from at least one of the first metrics and the second metrics that are related to the fault. Ingesting also includes assigning a second cardinality score to second metrics from at least one of the first metrics and the second metrics that are unrelated to the fault. The first cardinality score is higher than the second cardinality score. The method also includes performing tumbling window processing on the ingested metrics by sorting the first metrics and the second metrics into time slices. Each of the time slices includes a corresponding data structure for storing the data in the different time periods. Tumbling window processing is also performed on the ingested metrics by storing more data in the time slices for the first metrics having the first cardinality score relative to the second metrics having the second cardinality score. The method also includes displaying the time slices on a display device.

Other aspects of the invention will be apparent from the following description and the appended claims.

BRIEF DESCRIPTION OF DRAWINGS

FIG. 2 shows an example of metrics defined with respect to FIG. 1, in accordance with one or more embodiments of the invention.

FIG. 3 shows an example of events defined with respect to FIG. 1, in accordance with one or more embodiments of the invention.

FIG. 8A, FIG. 8B, FIG. 9A, FIG. 9B, and FIG. 10 are examples of displays of metrics generated using the system shown in FIG. 1, in accordance with one or more embodiments of the invention.

DETAILED DESCRIPTION

Figure 1:
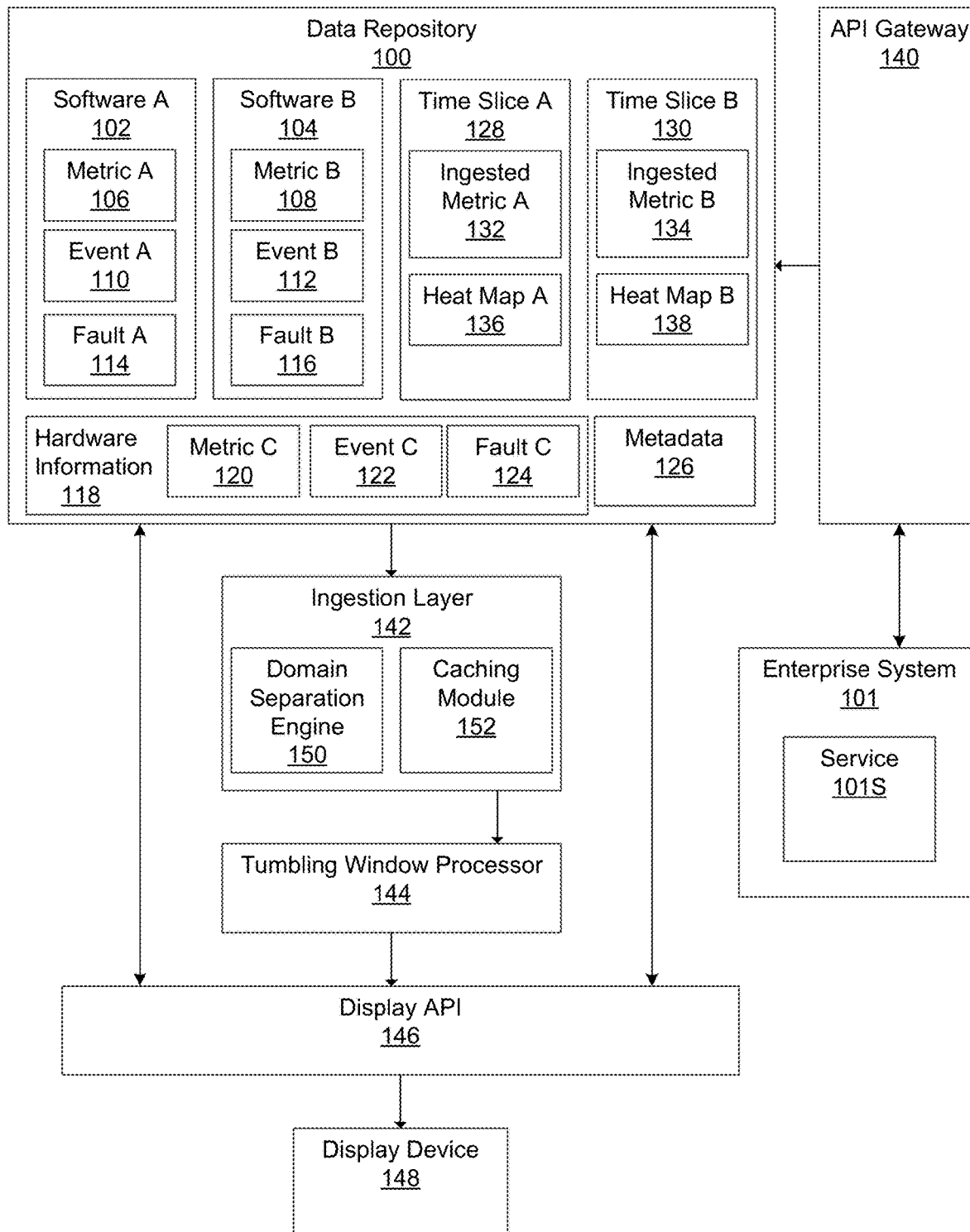
FIG. 1 shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to improving the speed and accuracy of addressing faults in an enterprise system. When service failures occur in an enterprise system, a service provider may be pressured to detect the failure, identify the cause of the failure, and resolve the failure. Preferably, the failure is detected, identified, and resolved before customers of the enterprise system, or supported software as a service (SaaS), are affected. In other words, the one or more embodiments are directed to reducing the mean time to identify (MTTI), mean time to detect (MTTD), and mean time to resolve (MTTR).

Known troubleshooting techniques involves manual activity, i.e., a programmer attempts to use a computer to hunt for the cause of a fault in the enterprise system or SaaS, which takes valuable time, up to several hours in some cases. The one or more embodiments provides a tool that can reduce the MTTI, MTTD, and/or MTTR by providing the following capabilities: (1) provide operations personnel an up-to-date granular view of what caused the failure so that the failure can be solved before customers are affected and (2) provide a scalable platform to handle a large enterprise and/or SaaaS, and 3) provide an up-to-date, granular view of faults within seconds, or less, of the occurrence of a fault.

The one or more embodiments accomplish these functions using the architecture and methods described further below with respect to the figures. In summary, the one or more embodiments use a software architecture to gather data from many sources, enrich the data, sort the data into time slices, and present the data in a visual format which is human-readable and can be navigated quickly by a human technician. Thus, the architecture includes an application programming interface (API) gateway, an ingestion layer, a set of tumbling window processors, and caches which operate to gather, enrich, and sort the data for presentation to a user via a graphics API. Details regarding this architecture are presented below.

Thus, the one or more embodiments, address two technical issues. The first technical issue is identifying the source and cause of faults in a timely manner in an enterprise system. As described more fully below, existing tools for identifying faults in a large enterprise (e.g. 20,000 or more concurrent users of a SaaS) may take many minutes or hours to identify and isolate a fault, whereas the one or more embodiments can operate in seconds or less. The second technical issue is presenting a vast amount of information to a human technician in a manner which the technician can review in a meaningful way in a time period deemed acceptable for addressing faults in a large enterprise system. Without the data presentation techniques described herein, a human user is likely to be overwhelmed with information, even when the data has been filtered for relevancy with respect to a particular fault in the enterprise or SaaS. Because most or all of the information is relevant, most or all of the information should be available to the technician, but present in a manner the technician can use in a timely manner.

FIG. 1 shows a computing system, in accordance with one or more embodiments of the invention. The computing system includes a data repository (100). In one or more embodiments of the invention, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a variety of different kinds of data useful for accomplishing the one or more embodiments. The data includes three different classes of data: raw data, enriched data, and output data. Raw data is data gathered from an enterprise system (101) and/or a service (101S) operating within the enterprise system (101), such as a service (SaaS).

Enriched data is raw data that has been pre-processed as described further below, and thus is composed of both raw data and metadata associated with the raw data. Metadata is "data about data." For example, "data" might be "fault data" that indicates that a fault occurred in a particular function of the SaaS. "Metadata," in a simplistic example, might be a timestamp associated with the fault data that indicates when the fault occurred. Other examples are given below. Lastly, output data is data that is sorted and organized in a manner that is human readable in a manner that is more easily and more quickly understandable.

The enterprise system (101) is a set of hardware and/or software used to accomplish a technical result for an organization. The service (101S) is one or more software programs and/or hardware that deliver a service or product to a user over a network, or help the enterprise system (101) to deliver a service. An example of the service (101S) is a Software as a Service (SaaS). More than one service may be present in the enterprise system (101).

The data repository (100) may store one or more software programs maintained by the enterprise system (101), such as Software A (102) and Software B (104). As used herein, "software" refers to software as a service (SaaS) or supporting software used to support the enterprise system (101).

Each instance of software may be associated with a metric, such as Metric A (106) and Metric B (108). As used herein, a "metric," when used with respect to software or hardware, is defined as a measurement or observation taken with respect the performance or programming of the corresponding software or hardware within the enterprise system (101). The term "associated with a metric" means that the metric is defined with respect to the particular software instance in question. Examples of metrics include, but are not limited to, time the software uses to perform a routine, statistical operational data, etc. In one or more embodiments, a metric describes operational behavior of one or more software programs executing in the enterprise system (101), wherein each set of the metrics represents data for a different time period in multiple time periods. Examples of metrics are shown in FIG. 2.

Each instance of software may be associated with an event, such as Event A (110) and Event B (112). As used herein, an "event," when used in conjunction with software or hardware, refers to an action performed by, on, or with respect to the corresponding software or hardware. Thus, an event may include a direct event, such as a report that software or hardware has produced an output or thrown a fault, or an indirect event, such that a report from some other software or hardware that the software in question may be behaving unexpectedly. In one or more embodiments, an event represents a behavior of interest over time in one or more software programs or hardware, wherein at least one of the events includes a fault in a first software program or hardware.

Accordingly, each instance of software may be associated with a fault, such as Fault A (114) or Fault B (116). As used herein, a "fault" is a type of event. A fault, when used in conjunction with software, occurs when software fails to function or functions outside of some pre-determined tolerance.

Metrics, events, and faults need not be associated only with software. For example, the data repository (100) may also include hardware information (118). Hardware information refers to data describing or related to hardware used in the enterprise system (101). The hardware information (118) may include a metric, such as Metric C (120), an event, such as Event C (122) or a fault, such as Fault C (124). The definition of metrics, events, and faults are similar to those used with respect to software, as defined above, but instead are associated with hardware.

Thus, the terms, "metric," "event," and "fault," as used herein, apply equally to both software and hardware. The one or more embodiments contemplate that each term may be associated with either or both hardware or software, unless described as being associated with only software or only hardware.

The data repository (100) also stores metadata (126). Metadata is defined as data that describes some other data of interest. In the context of the one or more embodiments, the metadata (126) may be data that correlates the events (Event A (110) and Event B (112)) to at least some of the metrics (Metric A (106) and Metric B (108)) over possibly multiple time periods. Examples of metadata (126) include a timestamp associated with fault data that indicates when the fault occurred, an indication of other programs or aspects of the enterprise system (101) affected by the fault thrown by a program or aspect of interest, an indication of a physical location of a hardware associated with a fault, a reference to lines of code which threw a fault, a class or identifier of users who use a particular program, and potentially many others.

The data repository (100) may also store time slices, such as Time Slice A (128) and Time Slice B (130). As used herein, a "time slice" is a data structure configured to store or reference data that is stored within a pre-defined time segment. Thus, for example, a "time slice" may be a data structure which stores or references data regarding events and metrics that occur with respect to the enterprise system (101) and the SaaS within a one minute time frame. The time frame may be expanded or contracted, depending on the size of the enterprise system (101) and design considerations identified by a computer programmer.

In a specific embodiment, the Time Slice A (128) and the Time Slice B (130) store ingested metrics, particularly Ingested Metric A (132) and Ingested Metric B (134). As used herein, an ingested metric is defined as a metric (e.g., Metric A (106) or Metric B (108)) enriched with the metadata (e.g. metadata (126)). The process of generating ingested metrics is defined with respect to FIG. 6.

The time slices may also store heat maps, such as Heat Map A (136) and Heat Map B (138). As used herein, a "heat map" is defined as data that summarizes operational behavior of software programs in ones of the time periods. The software programs may be the SaaS or may also be software that supports the enterprise system (101) that delivers the SaaS. In another embodiment, a heat map may also store operational behavior data of hardware that supports the enterprise system (101).

The system shown in FIG. 1 may include other components. For example, the system may also include an application programming interface (API) gateway, i.e., API gateway (140) in communication with the enterprise system (101). Generally, an API is a computing interface to a software component or a system that defines how other components or systems can use that software component or system. An API defines the kinds of calls or requests that can be made, how to make them, the data formats that should be used, the conventions to follow, etc.

In the context of the one or more embodiments, the API gateway (140) is configured to receive the metrics (e.g. Metric A (106) or Metric B (108)) from the enterprise system (101) and/or the SaaS. The API gateway (140) may also receive events (e.g., the Event A (110) or the Event B (112)), the faults (e.g. the Fault A (114) and the Fault B (116)), metadata (e.g., the metadata (126)), and possibly other types of data. The API gateway (140) may be programmed to deliver the data to appropriate software components for processing. In other words, the API gateway (140) is responsible for receiving, retrieving, and/or routing metrics in the form of data from the enterprise system. The API gateway (140) may also gather other information, such as which service in the enterprise system is calling which other service on which endpoint.

The system shown in FIG. 1 may also include an ingestion layer (142). The ingestion layer (142) is defined as software and/or hardware that is configured to ingest the metrics (e.g., the Metric A (106) and the Metric B (108)) to form the ingested metrics (e.g., the Ingested Metric B (132) and the Ingested Metric B (134)). The ingestion layer (142) may be programmed to associate the metadata (126) with the metrics (e.g., the Metric A (106) and the Metric B (108)) to form the ingested metrics (e.g., the Ingested Metric B (132) and the Ingested Metric B (134)). Thus, the ingestion layer (142) performs "value added" procedures on the incoming metrics, primarily in the form of enriching the metrics with metadata. Further details regarding the programming of the ingestion layer (142) are described with respect to FIG. 6.

The system shown in FIG. 1 may also include a tumbling window processor (144). In general, a tumbling window processor processes each window of data in time in a non-overlapping manner For example, each record on an in-application stream belongs to a specific window. In the context of the one or more embodiments, the tumbling window processor (144) is configured to process the ingested metrics and the events into the heat maps, sort the heat maps into the time slices, and populate the time slices with the ingested metrics. The functions of the tumbling window processor (144) are described further with respect to FIG. 5 and FIG. 6.

The system shown in FIG. 1 may also include a display application programming interface (display API (146)). The display API (146) controls display of information stored in the data repository (100) and/or output by the tumbling window processor (144). Thus, the display API (146) may be characterized as being configured to generate an output for displaying the time slices (e.g., the Time Slice A (128) and the Time Slice B (130)). The display API (146) may be configured to perform other functions, as described with respect to FIG. 4 and FIG. 6.

The system shown in FIG. 1 may also include a display device (148). The display device is a view screen, monitor, etc. which is configured to display the output produced by the display API (146). Thus, the display device (148) may display the human-readable graphical user interfaces described with respect to FIG. 8A through FIG. 10.

The system of FIG. 1 is not necessarily limited to the components described above. More, fewer, or different components may be present. For example, the ingestion layer (142) may include additional sub-components. In particular, the ingestion layer (142) may include a domain separation engine (150). The domain separation engine (150) may be configured to separate the metrics (e.g., the Metric A (106) and the Metric B (108)) into a first domain and a second domain. The first domain is a first retention policy determining how long metrics in the first domain will be stored. The second domain may be metrics related to the fault and a second retention policy determining how long metrics in the second domain will be stored. The first retention policy is less than the second retention policy, and the second domain may further store more data than the first domain. In this manner, more efficient data storage and caching may be achieved, which improves the speed of the tumbling window processor (144) and the performance of the overall system shown in FIG. 1.

As a specific example, a first domain may be metrics and a second domain may be events. Thus, the ingestion layer (142) may separate metrics and events, each separated into individual time slices by the tumbling window processor (144). This process is shown with respect to FIG. 4 and is further described with respect to FIG. 6.

The ingestion layer (142) may also include a caching module (152). The caching module (152) may be configured to hash the second domain to generate hashed data, and then cache the hashed data. Hashing the data further improves data processing and presentation efficiency, such as with respect to operation of the tumbling window processor (144), thereby further increasing the speed of the tumbling window processor (144) and the performance of the overall system shown in FIG. 1.

Speed and efficiency of data processing may be of concern, even for modern advanced processors and other hardware, due to the size of the amount of data generated for an at-scale large enterprise system (101). In a specific, non-limiting example, there may be a number of keys to be processed equal to the number sources times the number of destinations, times the number of uniform resource indicators (URIs) times the number of hypertext transfer protocol (HTTP) codes. In a large enterprise system (101), conservatively, the resulting number of keys to be processed may be half a billion, or more, per second. Even with modern hardware, is not possible to perform that number key lookups in a one minute time slice while loading the dashboard that controls the system, as even loading the much lower value of half a million keys could take as long as 30 minutes. Thus, the one or more embodiments must overcome a serious technical hurdle to handle the amount of in order to accomplish the desired results in the desired time period. The techniques for overcoming this challenge are described more fully with respect to FIG. 6.

While FIG. 1 shows a configuration of components, other configurations may be used without departing from the scope of the invention. For example, various components may be combined to create a single component. As another example, the functionality performed by a single component may be performed by two or more components.

FIG. 2 shows an example of metrics (200) defined with respect to the API Gateway (140) shown FIG. 1, in accordance with one or more embodiments of the invention. Again, a "metric" is defined as a measurement or observation taken with respect the performance or programming of the corresponding software or hardware within the enterprise system. The metrics (200) are shown in a table format which indicates a kind of metric in column (202) and a definition for a corresponding kind of metric in column (204). Thus, for example, one kind of metric is a "Count2X" in cell (206), which is defined as a count of HTTPS (secured hypertext transfer protocol) status codes labeled as "2X," as shown in cell (208).

The metrics (200) shown in FIG. 2 are measured with respect to the API gateway (140) shown in FIG. 1. Additional metrics may also be measured, with respect to any other part of the enterprise system or SaaS.

FIG. 3 shows an example of events (300) defined with respect to FIG. 1, in accordance with one or more embodiments of the invention. Again, an "event," refers to an action performed by, on, or with respect to corresponding software or hardware. The events (300) are shown in a table format which indicates a kind of event in column (302), a warning issued when a normal response is not received in column (304), and a normal response in column (306). Thus, for example, one kind of event is a "pod" event shown in cell (308), for which the warning is "unhealthy" in cell (310), but the normal operation indication is "scheduled" in cell (312).

The events (300) shown in FIG. 2 are measured with respect to the API gateway (140) shown in FIG. 1. Additional events may also be measured, with respect to any other part of the enterprise system or SaaS. Additional types of events may be present, such as but not limited to: ConfigMap, CronJob, DaemonSet, Deployment, Endpoints, HorizontalPodAutoscaler, Ingress, Job, Monitor, Node, SparkApplication, StatefulSet, etc.

The events gathered may include a vast amount of information, requiring storage space and processing power to process. Thus, in an embodiment, a summarized report of events of interest may be produced, and the summarized report processed in place of processing all of the events. A summarized report may be referred to as a "cleaned" event. A cleaned event may be obtained by using a script, such as the following pseudocode:

```
{  "cluster": "mpa-dogfood-1.k8s.local",
"verb": "ADDED",
"event": {
    "metadata": {
    },
    "involvedObject": {
        "kind": "Pod",
        "namespace": "mpa",
        "name": "k8s-events-forwarder-5c6f8c9fd9-srs8p",
        "apiVersion": "v1",
    },
    "reason": "Pulling",
    "message": "pulling image ....... ",
    "source": {
        "component": "kubelet",
        "host": "ip-10-0-2-21.us-west-2.compute.internal"
    },
    "firstTimestamp": "2019-09-12T17:45:13Z",
    "lastTimestamp": "2019-09-12T17:45:13Z",
    "count": 1,
    "type": "Normal",
    "eventTime": null,
    "reportingComponent": "",
    "reportingInstance": ""
    }
}
```

Figure 4:
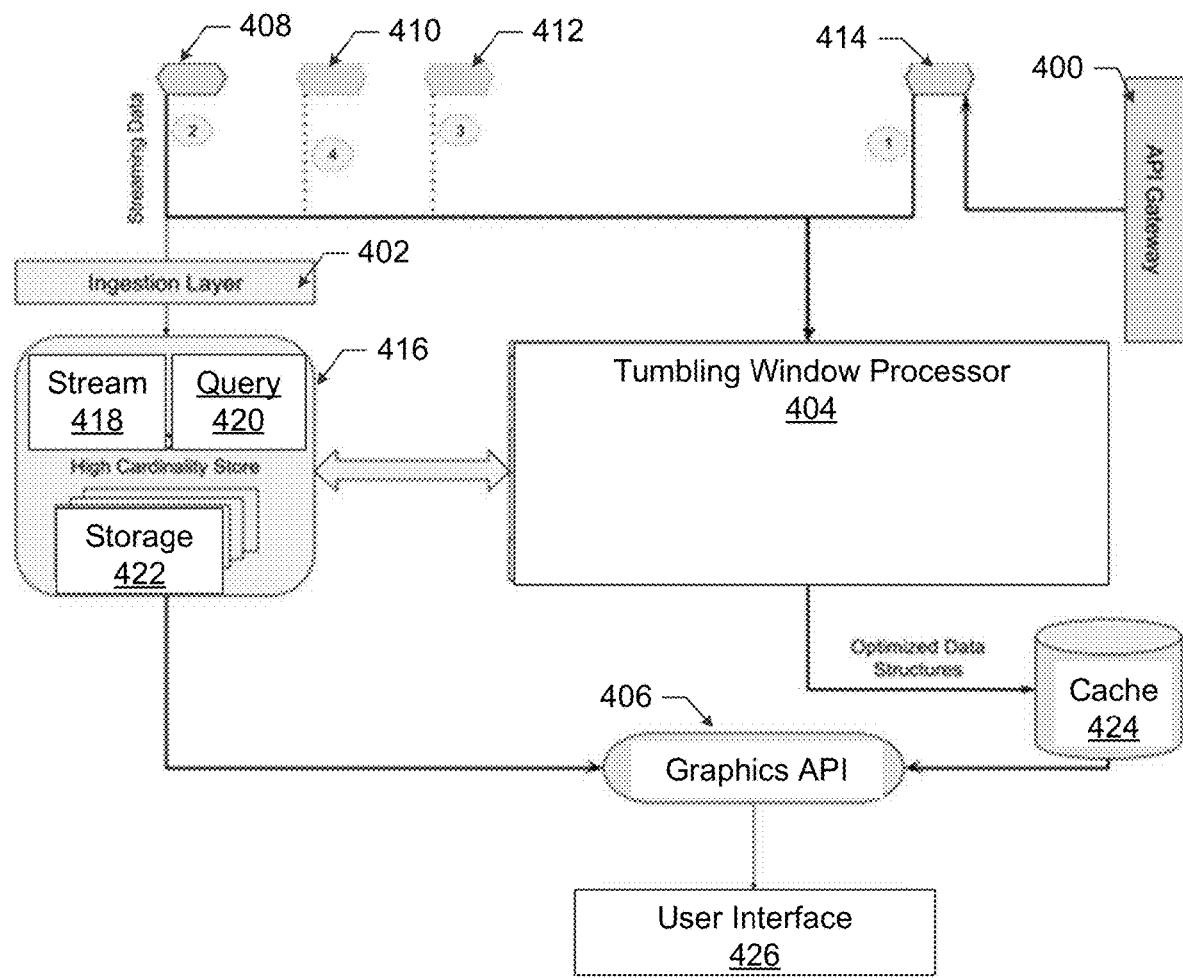
FIG. 4 shows an example of a system for providing and displaying metrics for an enterprise system, in accordance with one or more embodiments of the invention.

FIG. 4 shows an example of a system for providing and displaying metrics for an enterprise system, in accordance with one or more embodiments of the invention. The system shown in FIG. 4 may be a variation or a specific example of the system shown in FIG. 1.

The system shown in FIG. 4 has four main components: a API gateway (400), an ingestion layer (402), a tumbling window processor (404), and a graphics API (406). Each components is described in turn.

The API gateway (400) may be the API gateway (140) of FIG. 1 and have similar functionality. Thus, the API gateway (400) receives metrics (e.g., metric type A (408), metric type B (410), and metric type C (412)) and events (e.g. events (414)) from the enterprise system and/or SaaS. In this particular embodiment, some of the metrics and/or events may be provided directly to the tumbling window processor (404) and/or the ingestion layer (402).

The ingestion layer (402) may be several software and/or hardware programs that operate in conjunction with each other, including an operator discretization library, i.e., object definition language (ODL), ODL (416), that stores information at a high degree of cardinality; i.e. most or all of the incoming data from the API gateway (140) is initially stored prior to processing. The ODL (416) may include a stream processing software platform (418) configured to process a continuous stream of metrics and events from the API gateway (400). An example of the stream processing software platform (418) may be an open-source program known as KAFKA®.

The ingestion layer (402) also may compute a dependency graph data structure. The dependency graph may take the form of a tree data structure. The dependency graph may indicate the relationships between metrics, and the relationships between metadata and metrics. The dependency graph data structure may be used to support and provide the information used to build the time slices described with respect to FIG. 5, FIG. 7A, FIG. 8A and FIG. 8B.

The dependency graph, in particular, is composed of nodes and edges. Nodes represent enriched events and edges represent relationships among the enriched events. An example of building a dependency graph is provided with respect to FIG. 6.

The ODL (416) may also include a query engine (420) configured to query the metrics and events to find identified metrics and events of interest. An example of the query engine (420) may be an enterprise system query tool known as ATHENA®.

The ODL (416) may also include a data storage unit (422). The data storage unit (422) may be, for example, ELASTICSEARCH®. The query engine (420) may be used to obtain a summarized report of metrics and/or events of interest, which is then pushed to the data storage unit (422) for real time storage and retrieval. Thus, the data storage unit (422) may contain two kinds of data: a separate domain to store events with low retention policy and an API gateway data set grouped by uniform resource indicator (URI). The separate domain may be indexed based on cluster, namespace, kind and last timestamp. The API gateway data may be of high cardinality. The raw data store may be made inaccessible externally to avoid rough queries. If there is interest in data sets collected by these events, such data sets may be rolled up at appropriate cardinality, such as in five minute intervals, and inserted into a customer facing storage domain for dashboarding and access by the graphics API (406).

The tumbling window processor (404) processes the ingested data in order to summarize the metrics and events and generate a plot of events for each time frame. The time frame may be a one minute window, for example. The data created by the tumbling window processor (404) may be used to generate a heat map for a given service that experiences a fault. Examples of heat maps are shown in FIG. 8A through FIG. 10. Thus, the tumbling window processor (404) consumes and extract events and metrics that are generated within a time frame (e.g., one minute) into space-optimized data structures for each time frame through the use of hashing.

The data structures are stored in a cache (424), such as REDIS®, for fast retrieval when a user selects a time frame in a graphical user interface. The cache (424) may be a distributed, in-memory key-value database. The cache (424) may support different kinds of abstract data structures, such as strings, lists, maps, sets, sorted sets, HyperLogLogs, bitmaps, streams, spatial indexes, etc.

The cache (424) in conjunction with the output of the tumbling window processor (404) provides temporal and spatial locality. Temporal locality refers to the reuse of specific data, and/or resources, within a relatively small time window (e.g., a minute). Spatial locality refers to the use of data elements within relatively close storage locations to increase response time. The one or more embodiments increases temporality locality because multiple fields are fetched for a given time window and, due to ingestion and processing by the tumbling window processor (404), the fields are relevant.

Hashing of data may be used to abstract a memory efficient plain key-value store. A few keys use more memory than a single key containing a hash with a few fields. Hashes with few keys can be packed a linear array like structure (e.g. a ziplist) while still achieving desired performance.

In this manner, all data received by the API gateway (400), ingestion layer (402), and/or the tumbling window processor (404) is ultimately available to a human technician. However, only the most likely data of interest (e.g., faults, errors, etc.) is initially processed in the ingestion layer (402) in order to preserve processing resources. The data of interest is then shown in a summary fashion in the form of a heat map when the user selects a time frame in which a fault is located, though the user may drill down to specific information and messages if desirable. Thus, the one or more embodiments effectively increase the speed with which a computer can provide desired information, and also provide that information in a manner which a human user can understand. The graphics API (406) converts the data structures stored in the cache (424) into a human-readable form on a display device (426) or other user interface.

Figure 5:
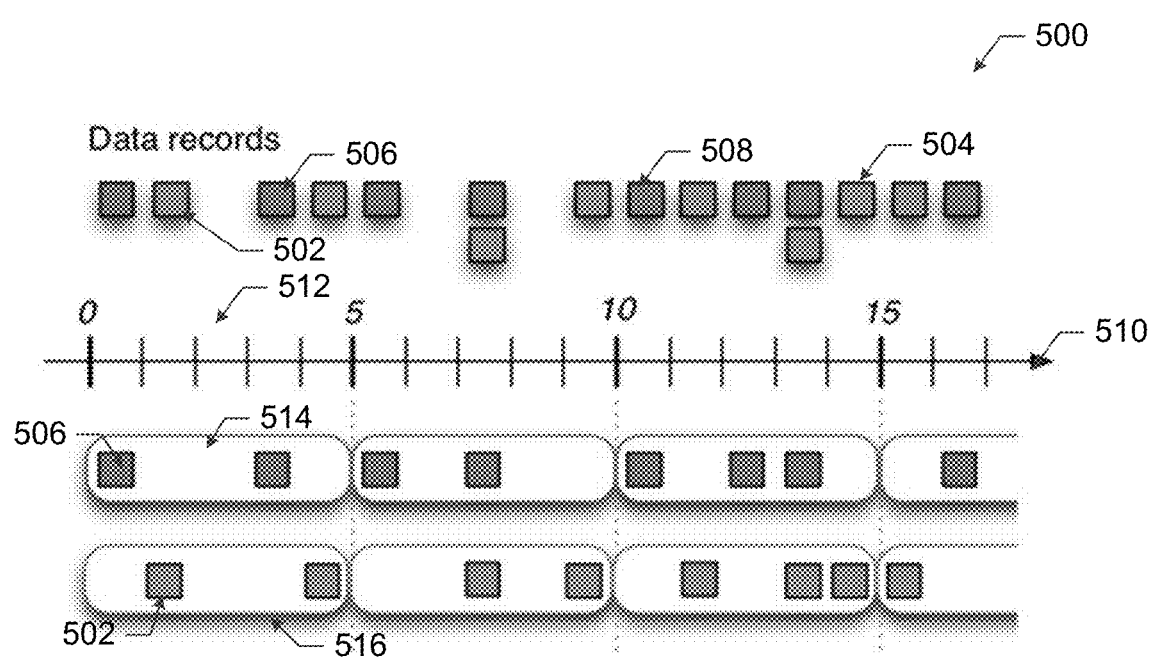
FIG. 5 shows an example of a tumbling window processor shown in FIG. 4, in accordance with one or more embodiments of the invention.

FIG. 5 shows an example of a tumbling window processor shown in FIG. 4, in accordance with one or more embodiments of the invention. The tumbling window processor (500) shown in FIG. 5 refers to the function and behavior of the tumbling window processor (500), as opposed to the architecture of a physical processor. The tumbling window processor (500) may also be implemented in the form of software executed by hardware.

In general, when a windowed query processes each window in a non-overlapping manner, the window is referred to as a tumbling window. Each record on an in-application stream belongs to a specific window. A window may be processed only once, when a query processes the window to which the record belongs.

The tumbling window processor (500) receives events (e.g., event (502) and event (504)) and metrics (e.g., metric (506) and metric (508)), as represented by the differently shaded boxes, over a period of time indicated by time arrow (510). In this example, the tumbling window processor (500) operates using five minute segments. Thus, the tumbling window processor (500) is divided into multiple segments in five minute intervals, as represented by the numbers "0", "5", etc.

Events and records in each time segment are divided into the segments, one segment per time window per type of information, in this example. Thus, time window 1 (512) includes two segments, Segment 1M (514) and Segment 1E (516). Each segment includes the information relating to corresponding events or metrics that occurred within the time window 1 (512). Thus, for example, the Segment 1M (514) contains the metric (506) and the Segment 1E (516) contains the event (502).

Figure 8A:
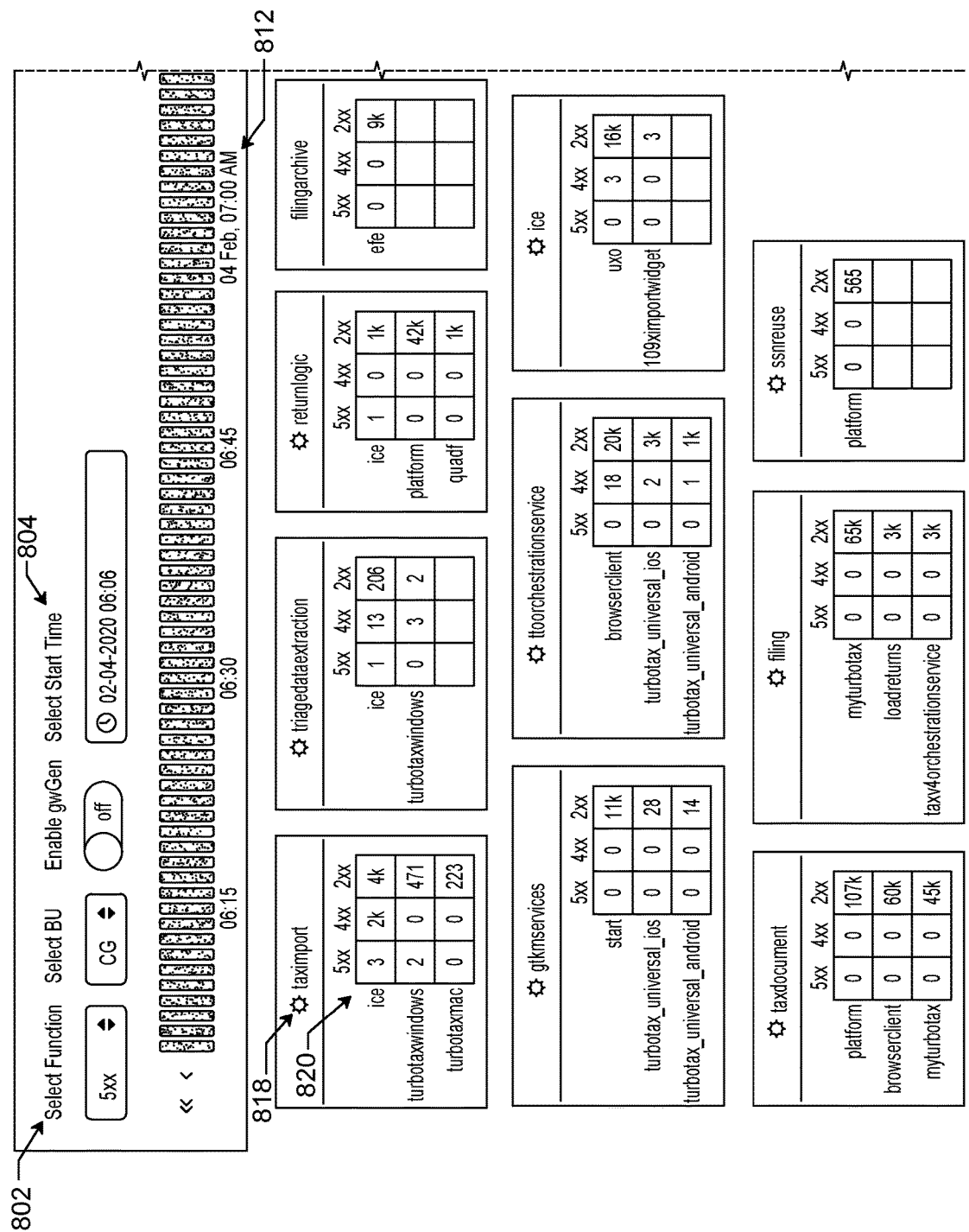
Figure 8B:
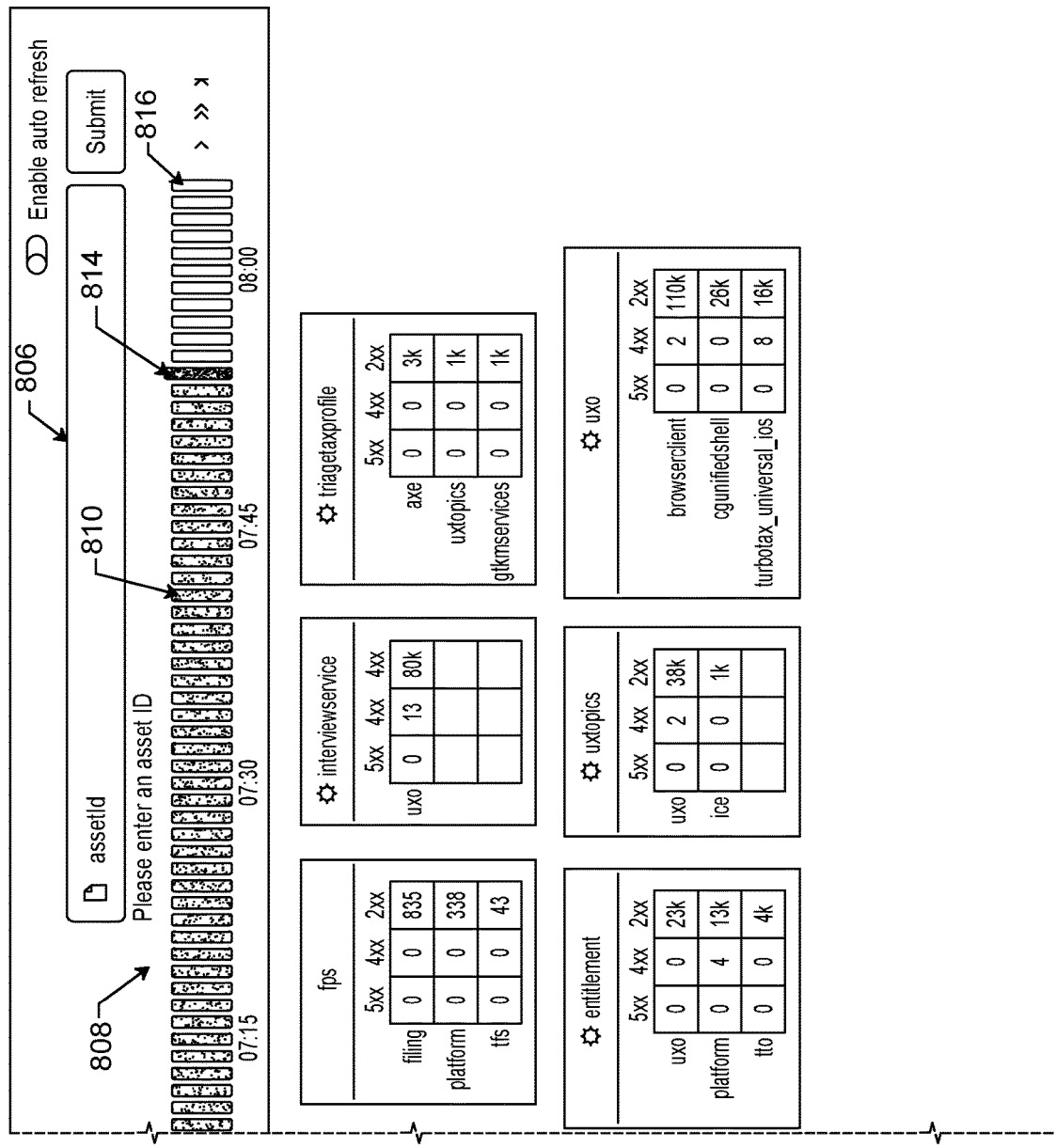

The segmentation performed by the tumbling window processor (500) allows relevant data to be sorted into time segments, such as shown in the sample graphical user interface (GUI (800)) shown in FIG. 8A and FIG. 8B. However, because the underlying data is sorted by data type within a given segment, if a user selects a time segment on the GUI (800), then a heat map of faults and other information can be shown, also as reflected in FIG. 8A and FIG. 8B.

In an embodiment, the tumbling window processor (500) may be programmed to favor recording faults in segments, relegating other types of events to windows having fewer sub-types of data (i.e., non-fault data may be treated together with less granularity). In this manner, non-fault information may still be available to a computer scientist, but the more relevant fault information would be presented preferentially.

The one or more embodiments also contemplate handling delays in reporting fault information in a more efficient manner. For example, a computer scientist desires to calculate how many "gw errors" happened per unit of time. Assume tN represents the Nth time unit and "*" represent a single unit of fault information. In this case, the following aggregation may be achieved:

| t1 | t2 | t3 | ... |
|----|----|----|-----|
| * * * * | ** * | * *** * * | ... |

Thus, in t1 there are 4 events, in t2 there are 3 events, and in t3 there are 6 events.

Suppose one of the events that happened during t1 actually took a little bit of time to reach the system, and only came during t2. In this case, if the processing time was used as a reference, the following different results would be generated: in t1 there would be 3 events, in t2 there would be 4 events, and in t3 there would be 6 events.

Assume the t2 late event is detected as being a late t1 event. In this case, the t2 late event will be discarded. The aggregated result for t1 might be incorrect but the result for t2 would remain correct. To preserve processing resources, instead of correlating the late event with the correct aggregation window, correction can be performed only when the computer scientist desires to enquire as to that particular time window or source of information.

Figure 6:
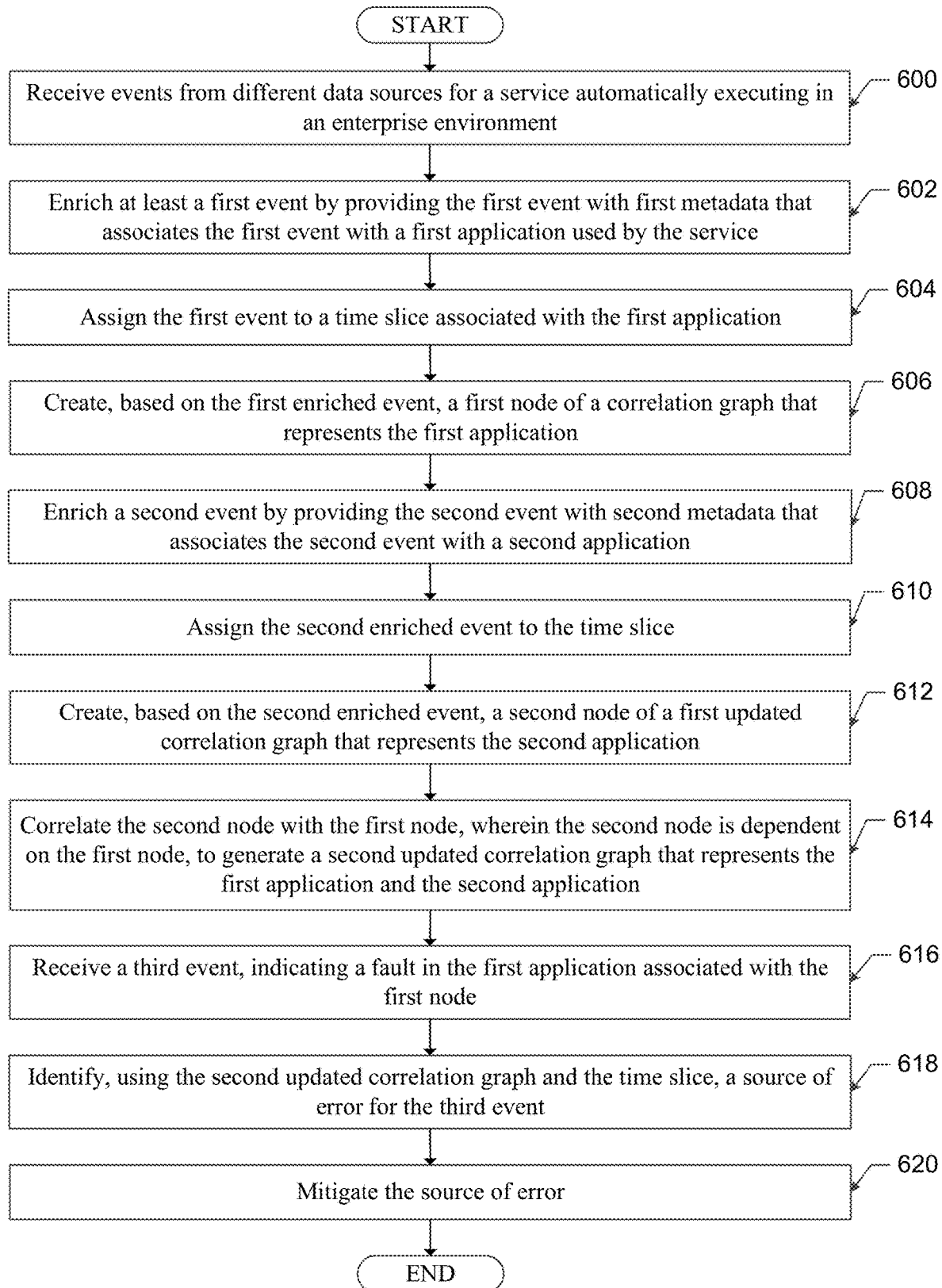
FIG. 6 is a flowchart of a method for mitigating an error in an application operating in an enterprise system, in accordance with one or more embodiments of the invention.

FIG. 6 is a flowchart of a method for mitigating an error in an application operating in an enterprise system, in accordance with one or more embodiments of the invention. The method shown in FIG. 6 may be implemented using the system shown in FIG. 1 or the system shown in FIG. 4.

At step 600, events are received from different data sources for a service automatically executing in an enterprise system. The events may be received via an API Gateway and provided to a data repository and/or an ingestion layer for later processing. In an embodiment, metrics about the enterprise system and/or the system may also be received via the API gateway and/or the ingestion layer.

At step 602, at least a first event is enriched by providing the first event with first metadata that associates the first event with a first application used by the service. Enriching the first event generates a first enriched event. For example, the metadata may indicate that an event is tied to a particular SaaS. Additional metadata may be associated with the first event. For example, a metric may indicate an age or time stamp associated with the event, and the metadata associated with the event may reflect the time stamp. Additionally, the metadata may also be derived from metrics associated with the event.

Association of metadata with an event may be accomplished by operation of an ingestion layer, such as ingestion layer (142) described with respect to FIG. 1. The ingestion layer (142) receives the metrics, events, and other information, and associates related data using metadata, as reflected in FIG. 4. Additionally, the ingestion layer (142) builds the graph data structure, as described above and detailed with respect to FIG. 6, to support the creation of time slices, as described with respect to FIG. 4, FIG. 7A, FIG. 8A and FIG. 8B.

At step 604, the first event is assigned to a time slice associated with the first application. An event is assigned to a time slice via operation of a tumbling window processor, such as tumbling window processor (144) in FIG. 1. As further shown in FIG. 4, the tumbling window processor separates data received or generated in different time slots into individual groups. That separated data is stored in the form of a time slice, which in turn is stored in a data repository for later retrieval.

At step 606, a first node of a correlation graph that represents the first application is created, based on the first enriched event. The correlation graph includes one node and zero edges after this step.

At step 608, a second event is enriched by providing the second event with second metadata that associates the second event with a second application. Enriching the second event generates a second enriched event.

At step 610, the second enriched event is assigned to the time slice. Assignment of an enriched event to a time slice may be performed by a tumbling window processor, as described with respect to FIG. 4.

At step 612, a second node of a first updated correlation graph that represents the second application is created, based on the second enriched event. The updated correlation graph, after this step, includes two nodes and zero edges.

At step 614, the second node is correlated with the first node, wherein the second node is dependent on the first node, to generate a second updated correlation graph that represents the first application and the second application. The second updated correlation graph, after this step, includes two nodes and one edge.

At step 616, a third event is received, indicating a fault in the first application associated with the first node. The third event is also received by the API gateway and processed by the ingestion layer, as shown in FIG. 4.

At step 618, a source of error for the third event is identified, using the second updated correlation graph and the time slice. For example, once the correlation graph is built, the relationships among events and metrics is known. As a result, once an error or fault occurs, it is possible to trace the relationships described by the correlation graph to find the source of an error. The source of the error can then be more easily presented to a user upon request, in particular by displaying the time slice to a user. An example of such a procedure is shown with respect to FIG. 8A through FIG. 10.

Note that the source of the error may be identified using both the second updated correlation graph and the time slice. In particular, the time slice provides the data structure for dividing enriched data (incoming data enriched with metadata as in the earlier steps in FIG. 6) into time slots and for presenting the enriched data in a hierarchical manner, while the correlation graph provides the underlying relationships among data which support the production of the time slice. Stated differently, the time slice provides the hierarchical and temporal understanding of the data so that the error can be identified readily by a human or by a computer program, while the correlation graph provides the underlying relationships among the data which allow the time slice to be constructed. In this manner, the source of the error is identified using both the second updated correlation graph and the time slice.

As a practical example, assume that errors are detected in a service executing in an enterprise environment. The correlation graph may correlate the causes of the error in the different layers of the enterprise environment infrastructure. The correlation occurs by associating the different nodes (which associate events with applications) with edges (which indicate the relationships among the nodes).

As a more specific example, assume that Service A experiences an error caused by Service B. Service A is dependent on Service B. However, the error is reported for Service A. The correlation graph establishes a traceable connection between the error that was reported for Service A and the root error that occurred in Service B. Thus, the dependency graph provides upstream and downstream, relative to the flow of information, information to find the cause of errors.

At step 620, the source of error is mitigated. The source of the error may be mitigated by a variety of different techniques, depending on the nature of the source of the error. For example, the source of the error could be automatically mitigated by removing communication of the faulty software program or hardware device from the rest of the enterprise system and replacing the faulty software program or hardware device with a backup program or a backup hardware device. The faulty software or hardware can then be addressed as needed while the enterprise system at large continues to function, perhaps in a manner transparent to the end user. The course of the error could also be mitigated by restarting or reinitializing software or hardware, by updating drivers, by updating versions, or may possibly many other techniques. Mitigation is, in many embodiments, performed automatically without user input. However, in other embodiments, mitigation may be performed by a computer scientist who uses a computer to manually make changes or updates to the enterprise system.

The method shown in FIG. 6 may be varied, including more, fewer, or different steps. For example, in an embodiment, the method of FIG. 6 may also include using the relationships known via the correlation graph to identify and mitigate other faults. Thus, for example, the method of FIG. 6 may also include, responsive to receiving the third event, identifying a second fault in the second application associated with the second node. A second source of error for the second fault may be identified, using the second updated correlation graph. The second source of error may then be mitigated.

Figure 9A:
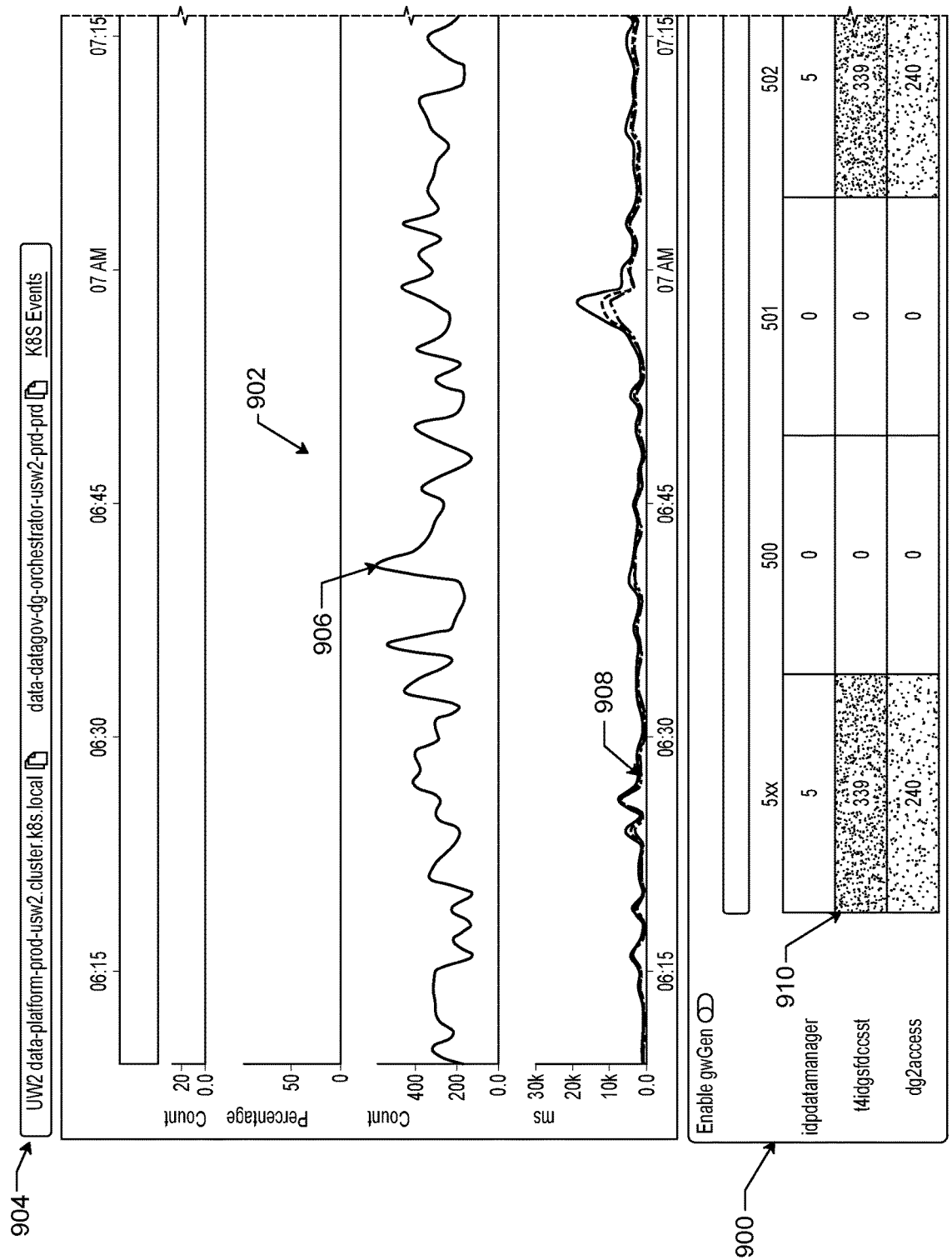
Figure 9B:
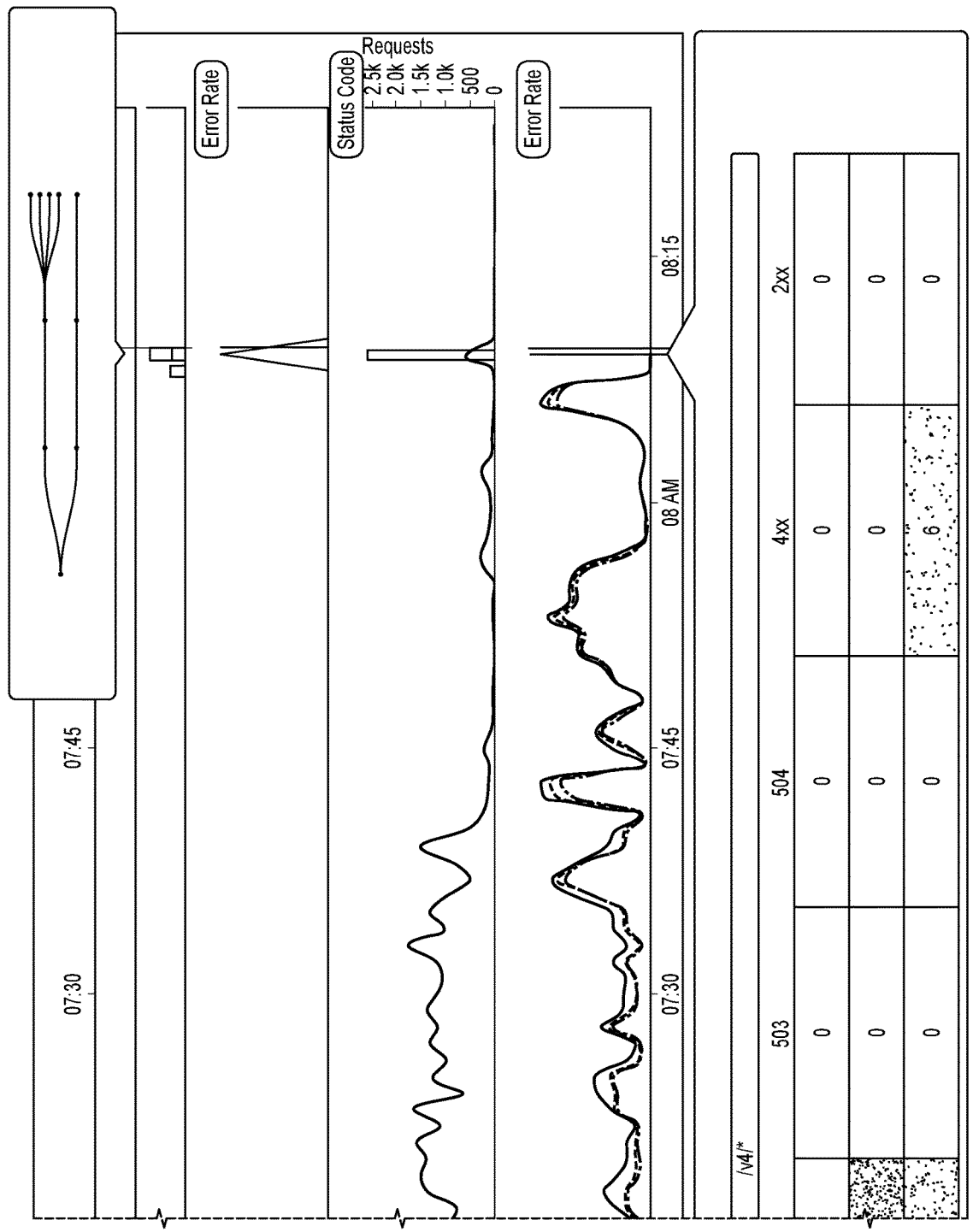

The method of FIG. 6 may also include displaying only time slices, including the time slice. An example of such a display is shown in FIG. 8A and FIG. 8B. Nevertheless, additional information may be displayed if desirable. For example, the method may also include, responsive to receiving user input selecting the time slice, displaying the second updated correlation graph. Again, FIG. 8A and FIG. 8B shows show an example of this procedure. The additional information displayed in response to selecting a time slice may be a heat map indicating the fault. Responsive to receiving additional user input selecting an indication of the fault in the heat map, displaying detailed information regarding the fault. An example of displaying such additional information is shown in FIG. 9A, FIG. 9B, and FIG. 10.

The display of information may be accomplished via a display API. In particular, the display API may also be configured to receive user input selecting one of the time slices displayed as a selected time slice; and, responsive to selecting, display a heat map that is associated with the selected time slice.

The display API may be configured to display the output in a specific manner which enhances the ability of a human to quickly understand the vast amount of information generated by the system. Specifically, the display API may be further configured to generate the output for displaying the time slices adjacent to each other, display a line longitudinally through the time slices, display metrics related to the software programs above the line, and display metrics related to the enterprise system below the line. An example of this arrangement is shown in FIG. 4.

In another embodiment, the method of FIG. 6 may include displaying the time slice among additional time slices associated with concurrently updated correlation graphs that indicate time-based behavior of the first application and the second application within the time slices. In other words, if desirable, multiple time graphs and multiple sets of time slices may be displayed for different aspects of an enterprise system, or perhaps for multiple enterprise systems. Again, the method may also include, responsive to a user selecting one of the time slice or one of the additional time slices, displaying operational information for at least one of the first application and the second application in a corresponding time slice that was selected.

Other variations to the method of FIG. 6 are possible. For example, the first application and the second application may be different logical applications. In this case, the first event and the second event are different events at the same or different times. However, in another example, the first application and the second application may be different corresponding functions of a single logical software program. In this case, the first event and second event may be different events at different times, ore reflect different events with respect to different operational aspects of the single logical software program at the same time.

Figure 7A:
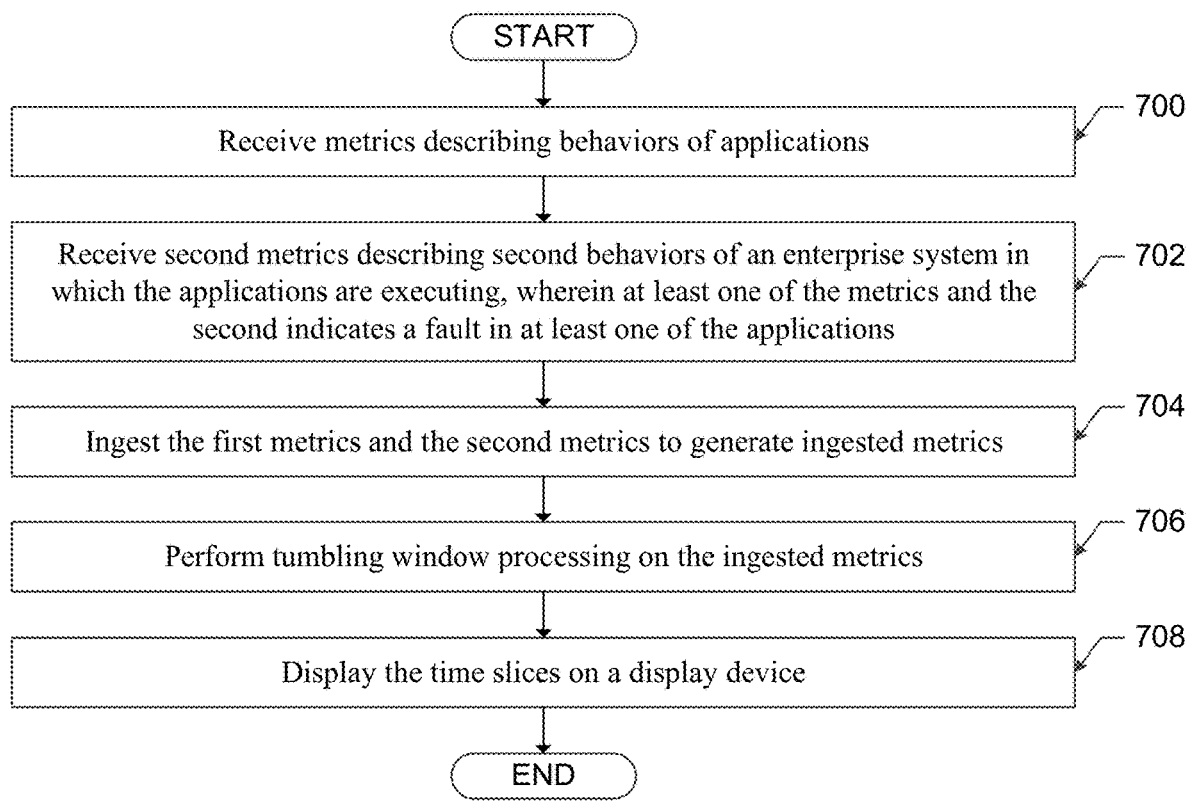
FIG. 7A, FIG. 7B, and FIG. 7C are a flowcharts of a method for displaying metrics regarding operation of applications in an enterprise system, in accordance with one or more embodiments of the invention.
Figure 7B:
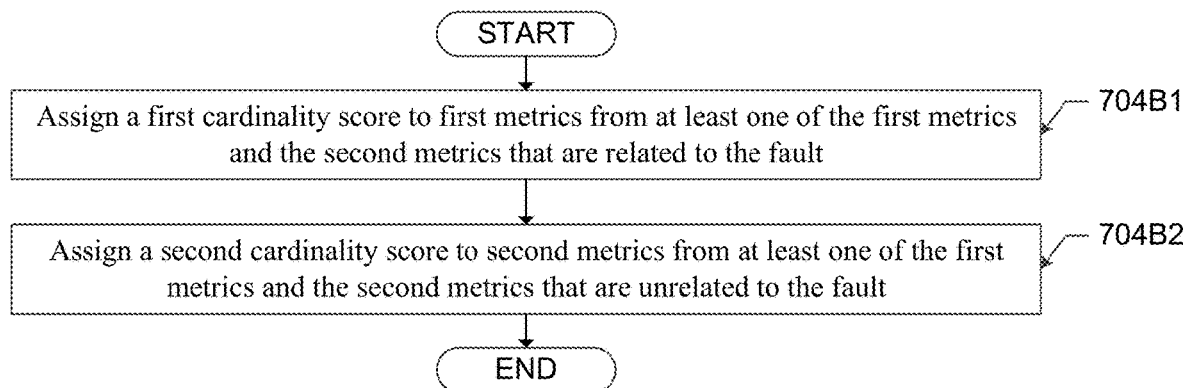
Figure 7C:
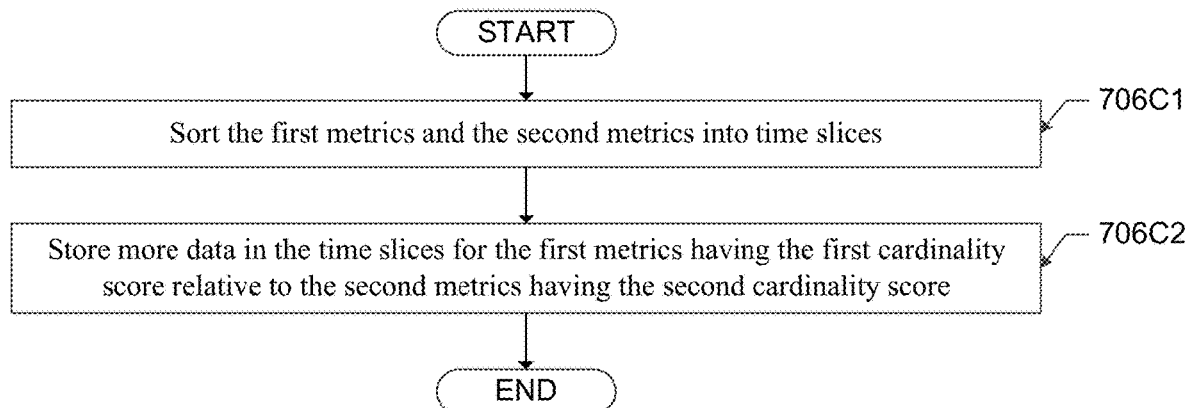

FIG. 7A, FIG. 7B, and FIG. 7C are flowcharts of a method for displaying metrics regarding operation of applications in an enterprise system, in accordance with one or more embodiments of the invention. FIG. 7A describes the overall flow, while FIG. 7B and FIG. 7C show additional possible sub-steps for the ingestion step and the tumbling window processing step described for FIG. 7A. The method shown in FIG. 7A, FIG. 7B, and FIG. 7C may be implemented using the system shown in FIG. 1 or the system shown in FIG. 4.

Attention is first turned to FIG. 7A. At step 700, metrics are received that describe the behaviors of applications. At step 702, second metrics are received that describe second behaviors of an enterprise system in which the applications are executing, wherein at least one of the metrics and the second metrics indicates a fault in at least one of the applications. In both steps, the metrics may be received via an API gateway, such as the API gateway (140) shown in FIG. 1.

At step 704, the first metrics and the second metrics are ingested to generate ingested metrics. The metrics may be ingested via an ingestion layer, such as the ingestion layer (142) described with respect to FIG. 1. The process of ingestion is further described with respect to FIG. 7B.

At step 706, tumbling window processing is performed on the ingested metrics. Tumbling window processing may be performed by a tumbling window processor, such as the tumbling window processor (144) described with respect to FIG. 1. The process of tumbling processing is described with respect to FIG. 7C.

At step 708, the time slices are displayed on a display device. The display may be accomplished using a display API, such as the display API (146) shown in FIG. 1, which commands a display device (e.g., a monitor) to display the time slices in the form of a graphical user interface (GUI). Examples of such a GUI and display is shown in FIG. 8A through FIG. 10.

Attention is now turned to FIG. 7B. The method of FIG. 7B may be performed as part of step 704 from FIG. 7A.

At Step 704B1, a first cardinality score is assigned to first metrics from at least one of the first metrics and the second metrics that are related to the fault. A cardinality score is a measure of the uniqueness of data values contained in a data set. The lower the cardinality score, the more duplicated data items are present.

The first cardinality score (and the other cardinality scores described below) may be calculated using different statistical algorithms. For example, procedures such as an auto regressive integrated moving average (ARIMA), double and triple exponential smoothing (Holt-Winters), cluster density distribution, Kolmogorov-Smirnov, extreme value statistics, exponential smoothing, standard deviation, simple moving average, and neural networks may all be used to calculate the first (and subsequent) cardinality scores.

At Step 704B2, a second cardinality score is assigned to second metrics from at least one of the first metrics and the second metrics that are unrelated to the fault. The first cardinality score is higher than the second cardinality score.

Attention is now turned to FIG. 7C. The method of FIG. 7C may be performed as part of step 706 from FIG. 7A. The method of FIG. 7C assumes that the method of FIG. 7B has been performed as part of performing step 704 of FIG. 7A.

At Step 706C1, the first metrics and the second metrics are sorted into time slices. Each of the time slices may be a corresponding data structure for storing the data in the different time periods. At Step 706C2, more data is stored in the time slices for the first metrics having the first cardinality score relative to the second metrics having the second cardinality score. An example of sorting metrics into time slices is shown in FIG. 8A and FIG. 8B.

The method reflected in FIG. 7A through FIG. 7C may be varied, including more, fewer, or different steps. For example, the method of FIG. 7A through FIG. 7C may also include hashing the data in the time slices to generate hashed data, and caching the hashed data. In this manner, data storage and presentation is made faster and more readily accessible.

In another example, the method of FIG. 7A through FIG. 7C may include receiving a user input selecting one of the time slices; and, responsive to receiving, retrieving the hashed data. In this case, the hashed data may be reconstituted to regenerate the data. The data may then be on the display device.

In another embodiment, the first metrics and the second metrics relate to multiple events. In this case, ingesting further includes enriching the events with metadata that correlates the events to at least some of at least one of the first metrics and the second metrics.

While the various steps in flowcharts shown in FIG. 6, FIG. 7A, FIG. 7B, and FIG. 7C are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

The following example is for explanatory purposes only and not intended to limit the scope of the invention. In particular, FIG. 8A, FIG. 8B, FIG. 9A, FIG. 9B, and FIG. 10 are examples of displays of metrics generated using the system shown in FIG. 1, in accordance with one or more embodiments of the invention. Thus, FIG. 8A through FIG. 10 are graphical user interfaces (GUIs) that should be considered together.

FIG. 8A and FIG. 8B shows an example GUI of a health monitoring system. In other words, a system, such as the system shown in FIG. 1, may order a display API to display the GUI shown in FIG. 8A and FIG. 8B. The example GUIs shown in FIG. 8A through FIG. 10 are used by a computer technician, Jane, who is responsible for maintaining at least part of the enterprise system of a company that provides tax preparation software as a service (a tax preparation SaaS).

The GUI shows a number of different user-input tools which may be used to vary what information is displayed or sought. The user-input tools include a function select menu (802) useable to select a function of the enterprise system that is to be displayed or monitored. A start time selection dialog box (804) allows a user to enter a selected start time. An asset identification dialog box (806) allows a user to specify an asset of the enterprise system that is to be monitored. Other tools may also be present. Jane may manipulate the tools in order to change the information displayed on the GUI shown in FIG. 8A and FIG. 8B.

The GUI shown in FIG. 8A and FIG. 8B may also display a time slice bar (808). The time slice bar (808) is shown as multiple bars, such as bar (810), shown side-by-side in a temporal sequence. A time legend (812) shows the time at various intervals. Each bar represents a one minute time slice. A current time slice (814) shows the current time window during which metrics are still being gathered, processed, and stored as described above. Future time slices (816) are empty, but are displayed for reference. In an embodiment, the color or shade or patterning within a time slice may be varied to indicate when a threshold number faults occurs, or during normal operation of the enterprise system during a particular time slice.

In an embodiment, Jane may select a time slice in order to display additional information underneath the time slice bar (808). In this particular example, Jane has selected time slice (810) as part of investigating when and how a particular fault occurred in a software program executing in the enterprise system.

In response to selecting the time slice bar (808), a number of heat maps are displayed on the GUI shown in FIG. 8A and FIG. 8B. Each heat map is associated with a particular function, software program, hardware, or other operational aspect of the enterprise system. The heat maps displayed may be varied by selecting a particular combination of entries in the user tools, described above.

Thus, for example, Jane selects time slice (810) and, in response, "taximport" heat map (818) is displayed among other heat maps. The taximport heat map (818) represents a heat map for a software function which imports tax information for a user as part of a larger tax preparation software that is offered as a SaaS by the company providing the SaaS and maintaining the enterprise system. Different operational functions of the taximport heat map (818) are shown as rows, and different types of errors or metrics are shown as columns. The color, shading, or hashing pattern displayed within a particular cell indicates the operational status of the particular function with respect to a particular error. For example, cell (820) may indicate that several faults are present with respect to the "ice" function with respect to the metric "5xx".

Jane decides that the gathered faults represented by cell (820) are of particular interest to her in terms of determining the source of the faults that occurred at time slice (810) and carried on to future time slices. Thus, Jane selects cell (820)

in order to display additional information represented by the summary graphic in the cell (820).

The display API then shows the GUI shown in FIG. 9A and FIG. 9B. The summary information in cell (820) is expanded and broken down into further detail, as shown in box (900). Again, color, shading, or hash patterns can indicate functions that are in a fault status. The row series shown reflect calling selected services on different methods. Each cell represents the number of different kinds of errors being reported.

Additionally, a set of graphs (902) show additional statistics for a particular function, identified in the name bar (904) displayed at the top of the GUI. Graph (906) shows a count of a particular event over time and graph (908) shows a total number of events over time for several different functions. In particular, graph (906) shows latency, and graph (908) shows the error rate for various services.

After reviewing the information shown in the GUI of FIG. 9A and FIG. 9B, Jane decides that the information summarized in cell (910) is of particular interest. Thus, Jane elects the cell (910), or in an alternative embodiment, Jane could have selected some point on one or both of the graphs (graph (906) and graph (908)).

In response, the display API then shows the GUI shown in FIG. 10. The GUI shown in FIG. 10 shows highly detailed information regarding specific events and/or metrics. Different events are shown in the rows, and information regarding each event is shown in the columns. For example, row (1000) shows the name of an event, the component of the SaaS in which the event occurred, the reason why the event occurred, and a specific message thrown by the component as a result of the event. In this particular example, Jane can see that a readiness probe failed, along with a hyperlink address and a reason for the fault (a timeout was exceeded). Thus, Jane is able to ascertain that a communication fault has arisen with respect to the component, which in turn allows Jane to rapidly test the required connections. After identifying the problem, Jane is able to mitigate the fault by restoring the communication by rebooting or re-initializing a particular service which allows the component to communicate as expected.

Thus, FIG. 8A through FIG. 10 show how the one or more embodiments may be used to reduce a mean time to identify, a mean time to detect, and a mean time to resolve a fault that occurred in an software program in a large scale enterprise system. By processing data according to the techniques described above, not only is the speed of automatically monitoring the health of the enterprise system increased, but also a vast amount of data is presented to a user in a manner that the user is able to quickly identify and resolve technical issues that arise in a SaaS or the enterprise that supports the SaaS.

Figure 11A:
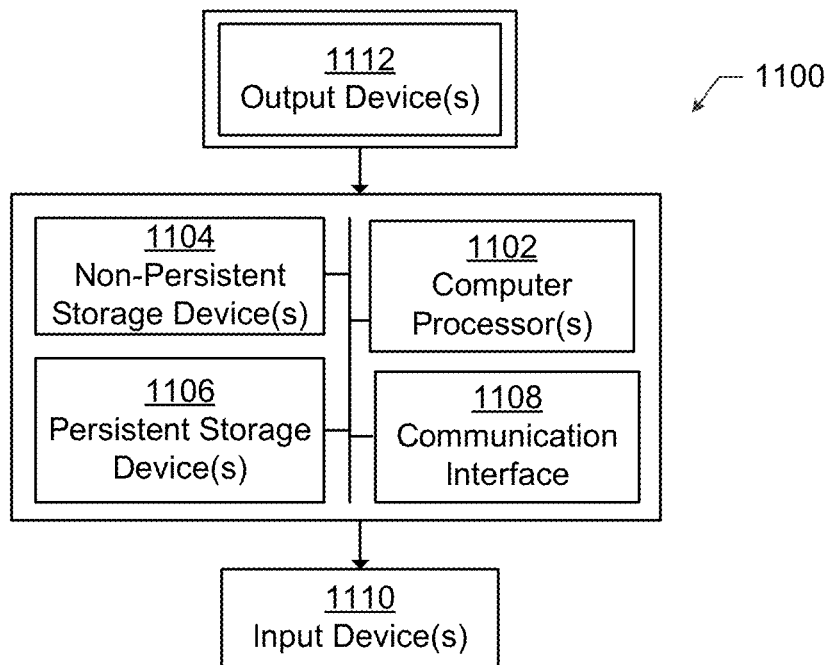
FIG. 11A and FIG. 11B are examples of a computing system and a network, in accordance with one or more embodiments of the invention.
Figure 11B:
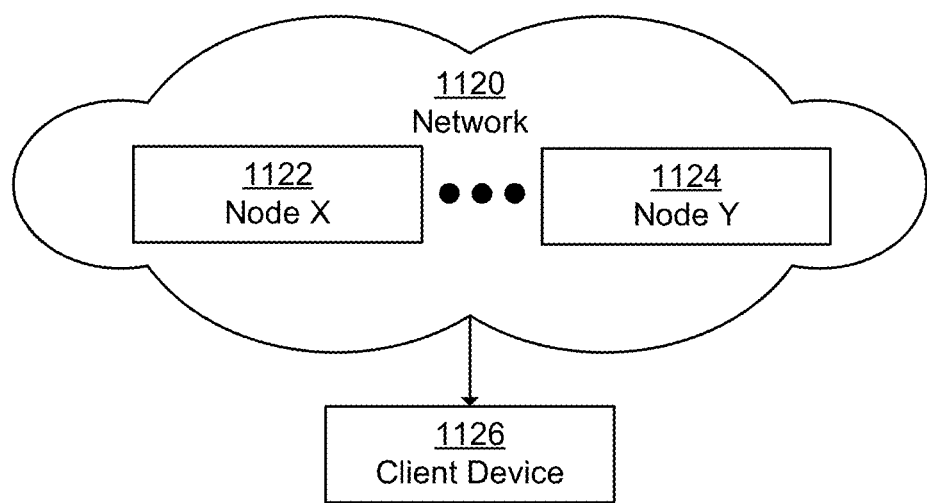

FIG. 11A and FIG. 11B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 11A, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1108) (e.g., Bluetooth interface, infrared interface, network interface, optical interface, etc.), and numerous other elements and functionalities that implement the features and elements of the disclosure.

The computer processor(s) (1102) may be an integrated circuit for processing instructions. For example, the computer processor(s) may be one or more cores or micro-cores of a processor. The computing system (1100) may also include one or more input devices (1110), such as a touchscreen, keyboard, mouse, microphone, touchpad, electronic pen, or any other type of input device.

The communication interface (1108) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1112), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1100) in FIG. 11A may be connected to or be a part of a network. For example, as shown in FIG. 11B, the network (1120) may include multiple nodes (e.g., node X (1122), node Y (1124)). Each node may correspond to a computing system, such as the computing system shown in FIG. 11A, or a group of nodes combined may correspond to the computing system shown in FIG. 11A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1100) may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system shown in FIG. 11A. Further, the client device (1126) may include and/or perform all or a portion of one or more embodiments of the invention.

The computing system or group of computing systems described in FIGS. 11A and 11B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 11A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 11A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 11A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 11A and the nodes and/or client device in FIG. 11B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving a first plurality of metrics describing a first plurality of behaviors of a plurality of applications;
receiving a second plurality of metrics describing a second plurality of behaviors of an enterprise system in which the plurality of applications are executing, wherein at least one of the first plurality of metrics and the second plurality of metrics indicates a fault in at least one of the plurality of applications;

ingesting the first plurality of metrics and the second plurality of metrics to generate ingested metrics, wherein ingesting comprises:

assigning a first cardinality score to first metrics from at least one of the first plurality of metrics and the second plurality of metrics that are related to the fault, and assigning a second cardinality score to second metrics from at least one of the first plurality of metrics and the second plurality of metrics that are unrelated to the fault, wherein the first cardinality score is higher than the second cardinality score;

performing tumbling window processing on the ingested metrics by:

sorting the first metrics and the second metrics into a plurality of time slices, wherein each of the plurality of time slices comprises a corresponding data structure for storing data in different time periods, and storing more data in the plurality of time slices for the first metrics having the first cardinality score relative to the second metrics having the second cardinality score; and displaying the plurality of time slices on a display device.

2. The method of claim 1, further comprising:
hashing the data in the plurality of time slices to generate hashed data; and
caching the hashed data.

3. The method of claim 2, further comprising:
receiving a user input selecting one of the plurality of time slices;
responsive to receiving, retrieving the hashed data;
reconstituting the hashed data to regenerate the data; and
displaying regenerated data on the display device.

4. The method of claim 1,
wherein the first plurality of metrics and the second plurality of metrics relate to a plurality of events, and
wherein ingesting further comprises:
enriching the plurality of events with a plurality of metadata that correlates the plurality of events to at least some of at least one of the first plurality of metrics and the second plurality of metrics.

5. The method of claim 1, further comprising:
generating, using a display API, an output for displaying the plurality of time slices.

6. The method of claim 5, wherein the method further comprises:
receiving user input selecting one of the plurality of time slices displayed as a selected time slice; and
responsive to selecting, displaying a heat map that is associated with the selected time slice,
wherein the heat map comprises a plurality of rows and a plurality of columns.

7. The method of claim 6, wherein:
the plurality of rows comprise different functions of a plurality of software programs, and
the plurality of columns comprise sets of error types or metrics for the plurality of software programs.

8. The method of claim 7, further comprising:
highlighting cells of the plurality of rows and the plurality of columns with one or more colors, shading, or hashing patterns,
wherein highlighting indicates operational statuses of the different functions with respect to the sets of error types or metrics.

9. The method of claim 7, further comprising:
receiving additional user input representing selection of a cell in the plurality of rows and the plurality of columns, and
displaying, responsive to receiving the additional user input, additional information represented by a summary graphic in the cell.

10. The method of claim 9, further comprising:
displaying the additional information by displaying a second table comprising columns of specific error or metric types with respect to rows of the different functions.

11. The method of claim 10, further comprising:
displaying fault status in the additional information using color, shading, or hash patterns in cells of the second table.

12. The method of claim 10, further comprising:
displaying a number of different kinds of errors in the additional information in cells of the second table.

13. The method of claim 10, further comprising:
displaying the additional information in a set of graphs showing statistics for a particular function selected from among the different functions displayed in the rows.

14. The method of claim 13, further comprising:
displaying the set of graphs as one or more lines showing one or more counts of events over time, wherein each of the one or more lines represents one of the different functions.

15. The method of claim 10, further comprising:
receiving further user input selecting a cell in the second table; and
displaying, responsive to receiving the further user input, detailed information regarding a specific event and a specific metric.

16. The method of claim 15, further comprising:
displaying the specific event and the specific metric by displaying a name of an event, a component of a software as a service in which the event occurred, a reason why the event occurred, and a message thrown by the component as a result of the event.

17. The method of claim 16, further comprising:
displaying a hyperlink address related to the component.

18. The method of claim 16, further comprising:
receiving a command to test the component; and
testing the component.

19. The method of claim 16, further comprising:
receiving a command to mitigate a fault in the component; and
mitigating the fault in the component.

20. The method of claim 1, wherein displaying the plurality of time slices comprises:
displaying the plurality of time slices as a plurality of bars shown side-by-side in a temporal sequence.

* * * * *